Patented Aug. 5, 1952

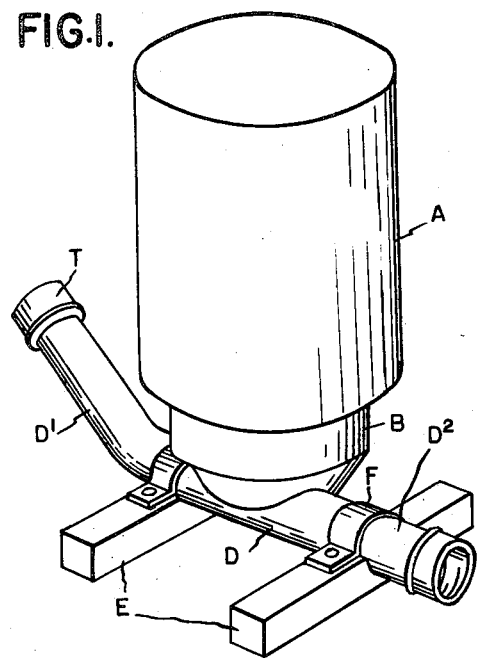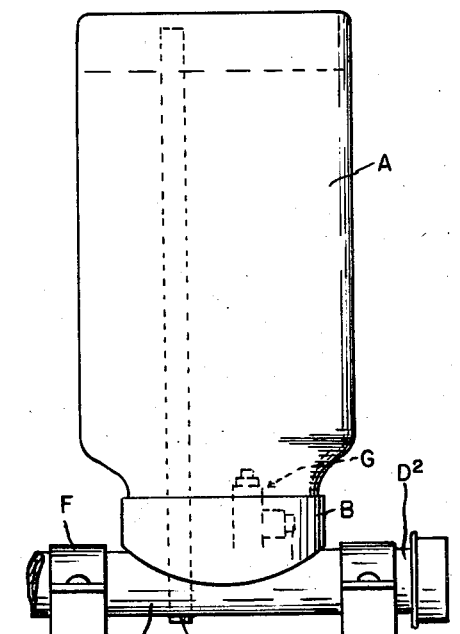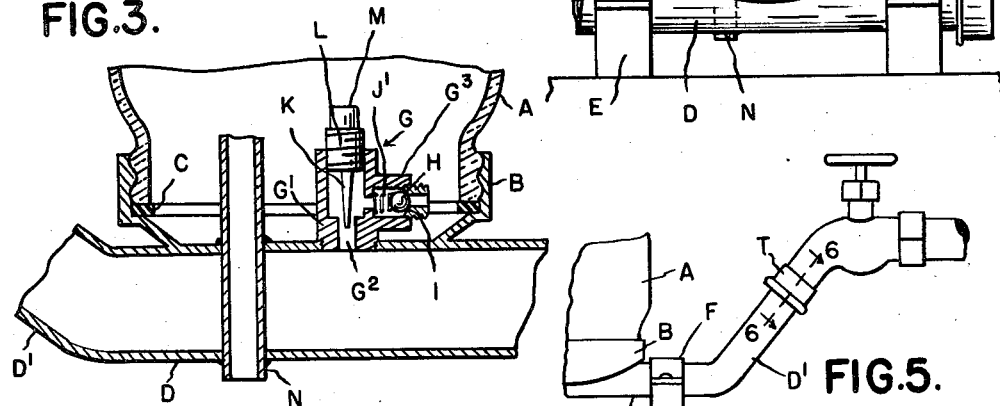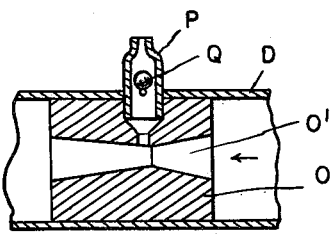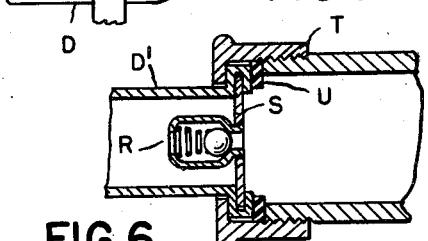

2,606,068

UNITED STATES PATENT OFFICE 2,606,068

FERTILIZER DISTRIBUTOR

Laurie J. Bonacor, Detroit, Mich.

Application November 14, 1949, Serial No. 127,078

1 Claim. (Cl. 299—84)

The invention relates to the distribution of liquid fertilizer over an extended area, and it is the object of the invention to obtain a construction attachable to the ordinary garden hose to be movable therewith, and which will feed into the liquid stream just the quantity of fertilizer which is required. To this end the invention consists in the construction as hereinafter set forth.

In the drawings:

Figure 1 is a perspective view of my improved fertilizer distributor;

Figure 2 is a side elevation thereof;

Figure 3 is a vertical section in the plane of the water conduit;

Figure 4 is a view similar to a portion of Figure 3 showing a modified construction;

Figure 5 is an elevation illustrating the direct attachment of the distributor to the faucet or water outlet; and Figure 6 is a section on line 6—6, Figure 5.

As illustrated A is a container which may if desired be formed of glass so as to be transparent and expose to view the quantity of liquid fertilizer therein. This container may be provided with a screw cap B and gasket C for forming a liquid tight seal. D is a conduit incorporated in the cap B and extending on opposite sides thereof. Preferably one end of this conduit is inclined upwards as indicated at D' so as to correspond more or less to the angle of the hose portion leading therefrom to the discharge nozzle. The other end portion $D^2$ may be horizontal to be attached to a portion of the hose lying upon the ground. The container is held in inverted but stable position by shoes E, which as shown are merely strips of wood or other suitable material extending transversely of the conduit D and secured thereto by clips F.

It is important not only to feed the fertilizer into the liquid stream but also to limit the quantity so as to avoid waste of material, while at the same time, the fertilizer will be uniformly distributed to all portions of the area sprinkled by the hose nozzle. I have accomplished this regulation by placing within the cap B a fitting G which, as specifically shown, is of T-shape having a portion G' attached to the conduit D and with a port $G^2$ in communication with the interior thereof. The lateral portion $G^3$ of the T-fitting forms an inlet in which is preferably located a check valve H shown as a ball normally held to a seat I by a spring J. The tension of the spring is limited so that liquid can pass from the container into the conduit D under the suction which will be generated by the stream of water passing through said conduit. This, however, would not regulate the quantity of fertilizer so discharged and I have, therefore, provided regulating means. This consists of a tapered metering pin K, which extends into the port $G^2$ and will decrease the opening from the interior of the fitting into said port in proportion to the extent that said pin is moved downward. The metering pin K is attached to a threaded plug L which engages a correspondingly threaded aperture in the upwardly extending nipple of the T. The plug L has a finger grip M by means of which it can be turned to produce the desired adjustment.

With the construction as thus far described it would be practically impossible to discharge the liquid fertilizer from the container into the water stream for the reason that there would be nothing to replace the liquid so discharged. I have, therefore, provided a small pipe N which passes through the conduit D and cap B extending to near the top of the space within the container. The lower end of this pipe N is raised above the ground by the shoes so as to provide free access for air. This will maintain at all times atmospheric pressure above the liquid in the container without regard to the quantity so that the discharge into the water stream is regulated solely by the metering pin K.

The construction as above described can be manufactured at small cost and may be readily attached to any garden hose which is used for sprinkling either a lawn or a garden. Before being thus used, the metering pin K is adjusted to restrict the quantity of fertilizer discharged from the container to that which is desirable.

Figure 4 illustrates a modified construction in which the water conduit D is provided with a plug O therein having a Venturi passage O' therethrough. The inlet fitting P from the container is connected to the throat of the venturi, thereby developing stronger suction than in the construction illustrated in Figure 3. The inlet fitting P has a check valve Q therein and may be further provided with metering means of any suitable construction (not shown).

It may sometimes be desirable to attach the distributor directly to the faucet or valve controlled outlet for the water supply. This is illustrated in Figure 5, and it will be noted that the obliquely inclined portion D' can be coupled to the threaded outlet nipple, which latter is also obliquely inclined. To avoid any danger of contaminating the water supply, a check valve is placed in the inlet N of the distributor. Thus as shown in Figure 6, the conduit D' has a spring closed check valve R at its end, which is attached to a disk S closing the end of the conduit with the exception of the opening through the check valve. The threaded coupler sleeve T forms the connection to the faucet and the usual gasket U seals this connection. Thus when the device is in use, water can freely pass from the faucet into the conduit D', but in case of any reverse pressure the check valve R closes to prevent the contents of the distributor from entering the water supply.

While I have described my improvement as primarily a fertilizer distributor, it is also useful for other purposes as, for instance, in the distribution of a weed killer or any other fluid to be distributed over an area.

What I claim as my invention is:

A portable fertilizer distributor comprising a conduit provided at the opposite ends thereof with couplings for a connection with water hose sections, an inverted cap mounted on said conduit, transversely extending shoes for supporting said conduit and cap on opposite sides of the latter, a container having a detachable sealing engagement with said cap and adapted to hold the liquid fertilizer to be distributed, a fitting within said cap forming a passage for the discharge of liquid from said container into the water stream in said conduit, regulating means consisting of a metering pin adjustably engaging said fitting determining the rate of discharge, a check valve in said fitting preventing reverse flow of liquid into said container and a conduit extending upward into said container to the upper end thereof, said conduit being open at its lower end for the passage of air therethrough to maintain constant atmospheric pressure on the liquid within said container.

LAURIE J. BONACOR.

REFERENCES CITED

The following references are of record in the file of this patent:

UNITED STATES PATENTS

| Number | Name | Date |
|---|---|---|
| 515,210 | Graves | Feb. 20, 1894 |
| 931,757 | Harmer | Aug. 24, 1909 |
| 1,039,365 | Coulter | Sept. 24, 1912 |
| 1,273,682 | Slater et al. | July 23, 1918 |
| 1,370,687 | Ferris | Mar. 8, 1921 |
| 1,954,154 | Urquhart | Apr. 10, 1934 |
| 2,295,661 | Hunter | Sept. 15, 1942 |
| 2,381,589 | Hayes | Aug. 7, 1945 |
| 2,507,410 | Kemp | May 9, 1950 |

FOREIGN PATENTS

| Number | Country | Date |
|---|---|---|
| 28,037 of 1913 | Great Britain | Dec. 5, 1913 |